United States Patent
Punzalan et al.

(10) Patent No.: US 11,475,039 B2
(45) Date of Patent: Oct. 18, 2022

(54) AUGMENTED REALITY DATABASE SYNCHRONIZATION SYSTEM

(71) Applicant: ADP, LLC, Roseland, NJ (US)

(72) Inventors: Roel Punzalan, Pasadena, CA (US); Nacho Andrade, Pasadena, CA (US)

(73) Assignee: ADP, Inc., Roseland, NJ (US)

( * ) Notice: Subject to any disclaimer, the term of this patent is extended or adjusted under 35 U.S.C. 154(b) by 597 days.

(21) Appl. No.: 15/946,285

(22) Filed: Apr. 5, 2018

(65) Prior Publication Data

US 2019/0311062 A1 Oct. 10, 2019

(51) Int. Cl.
| | |
|---|---|
| *G06F 16/00* | (2019.01) |
| *G06F 16/27* | (2019.01) |
| *G06F 16/23* | (2019.01) |
| *G06Q 40/00* | (2012.01) |
| *G06Q 10/10* | (2012.01) |

(52) U.S. Cl.
CPC .......... *G06F 16/27* (2019.01); *G06F 16/2365* (2019.01); *G06Q 10/105* (2013.01); *G06Q 40/12* (2013.12)

(58) Field of Classification Search
CPC ....... G06F 16/2468; G06F 16/24; G06F 16/27
USPC ........................................ 707/610, 758, 780
See application file for complete search history.

(56) References Cited

U.S. PATENT DOCUMENTS

| | | | |
|---|---|---|---|
| 7,236,632 B2 | 6/2007 | Erol et al. | |
| 9,361,716 B1 * | 6/2016 | Erikson | G06V 20/20 |
| | | | 707/707 |
| 10,339,608 B1 * | 7/2019 | Haitz | G06Q 10/0635 |
| | | | 707/707 |
| 2013/0050260 A1 * | 2/2013 | Reitan | G06F 8/315 |
| | | | 345/633 |

OTHER PUBLICATIONS

Krum et al., "Situational Visualization," Proceedings of the ACM Symposium on Virtual Reality Software and Technology, Dec. 11, 2001, 12 pages.
Ali et al., "A Novel Synchronization between SQL Server and Mobile Client Databases," International Journal of Applied Engineering Research, vol. 12, No. 12, 2017, pp. 3557-3561.

\* cited by examiner

*Primary Examiner* — Alexandria Y Bromell
(74) *Attorney, Agent, or Firm* — Yee & Associates, P.C.

(57) ABSTRACT

A method, an apparatus, a system, and a computer program product for synchronizing databases. A computer system detects first information in a live view on a mobile display system while the first information is displayed by a first service on a data processing system. The first information corresponds to second information managed by a second service. The computer system determines whether a discrepancy is present between the first information displayed on the data processing system and the second information managed by the second service. The computer system performs a number of actions to resolve the discrepancy in response to the discrepancy being present.

22 Claims, 10 Drawing Sheets

US 11,475,039 B2

AUGMENTED REALITY DATABASE SYNCHRONIZATION SYSTEM

BACKGROUND INFORMATION

1. Field

The present disclosure relates generally to an improved data processing system and, in particular, to a method, an apparatus, a system, and a computer program product for synchronizing databases.

2. Background

A database is a collection of data. A relational database is a type of database that contains a collection of schemas, tables, queries, reports, views, and other information. A database application is used to access the database. For example, the database application may interact with users, applications, and the database to perform operations such as storing data, organizing data, deleting data, retrieving data, or other operations with respect to the data in the database.

Databases are commonly used by organizations for various purposes. For example, a first service, such as a payroll service, may store information about employees and process payroll on a payroll database to issue paychecks to employees. The payroll service may be for a single company or the payroll service may be used to process payroll for many different companies.

A second service, such as a withholding service, may perform withholding operations for the payroll service. These withholding operations may include state tax withholdings, federal tax withholdings, retirement fund withholdings, and other types of withholdings.

As part of providing the withholding services, the withholding service may store data for performing withholding operations in a withholding database. At least a portion of the data stored in the payroll database may be used by the withholding service to perform withholding operations. This type of data in the payroll database may include, for example, an employee address, a number of personal exemptions, additional withholding amounts, a current gross pay, or other information that may be needed to perform the withholding operations. This data may be obtained by the payroll service accessing the payroll database managed by the payroll service. Further, when updates or changes are made to the payroll database, synchronization between the payroll database and the withholding database is needed for these types of data.

However, the databases may not be compatible. For example, software used to access each database may employ different protocols, such as application programming interfaces (APIs) or different queries. For example, first software that accesses a first database is unable to access a second database. Different versions of a database from the same vender may not be compatible.

Different services in different organizations within the same organization may use different databases from different venders or employ databases from the same vendor having different versions. As a result, the withholding service may not be able to easily access data managed by the payroll service. Creating interfaces to access different types of databases can be a time-consuming and costly effort.

Therefore, it would be desirable to have a method and apparatus that take into account at least some of the issues discussed above, as well as other possible issues. For example, it would be desirable to have a method and apparatus that overcome a technical problem with synchronizing data in databases.

SUMMARY

An embodiment of the present disclosure provides a method for synchronizing databases. A computer system detects first information in a live view on a mobile display system while the first information is displayed by a first service on a data processing system. The first information corresponds to second information managed by a second service. The computer system determines whether a discrepancy is present between the first information displayed on the data processing system and the second information managed by the second service. The computer system performs a number of actions to resolve the discrepancy in response to the discrepancy being present.

Another embodiment of the present disclosure provides a method for synchronizing information in databases managed by services over a network. A computer system receives a number of images from a display of first information on a data processing system in communication with a first service. The number of images is generated from a live view on a head-mounted display system operated by a user and received over the network while the live view of the display of the first information on the data processing system is present. The computer system determines whether the first information displayed on the data processing system corresponds to second information managed by a second service using the number of images received over the network from the head-mounted display system. The computer system determines whether a discrepancy is present between the first information and the second information in response to the first information corresponding to the second information. The computer system performs a number of actions through displaying augmented reality information on the live view on the head-mounted display system to resolve the discrepancy in response to the discrepancy being present.

Yet another embodiment of the present disclosure provides a database synchronization system comprising a computer system and an information manager running on the computer system. The information manager is in communication with a mobile display system. The information manager detects first information in a live view on the mobile display system while the first information is displayed by a first service on a data processing system. The first information corresponds to second information managed by a second service. The information manager determines whether a discrepancy is present between the first information displayed on the data processing system and the second information managed by the second service, and performs a number of actions to resolve the discrepancy in response to the discrepancy being present.

Another embodiment of the present disclosure provides a database synchronization system comprising a computer system and an information manager running on the computer system. The information manager receives a number of images from a display of first information on a data processing system in communication with a first service. The number of images is generated from a live view on a head-mounted display system operated by a user and received over a network while the live view of the display of the first information on the data processing system is present. The information manager determines whether the first information displayed on the data processing system corresponds to second information managed by a second service using the number of images received over the network from the head-mounted display system. The information manager determines whether a discrepancy is present between the first information and the second information in response to the first information corresponding to the second information, and performs a number of actions through displaying augmented reality information on the live view on the head-mounted display system to resolve the discrepancy in response to the discrepancy being present.

Yet another embodiment of the present disclosure provides a computer program product for synchronizing databases. The computer program product comprises a computer-readable storage media, first program code, second program code, and third program code which are stored on the computer-readable storage media. The first program code detects first information in a live view on a mobile display system while the first information is displayed by a first service on a data processing system. The first information corresponds to second information managed by a second service. The second program code determines whether a discrepancy is present between the first information displayed on the data processing system and the second information managed by the second service. The third program code performs a number of actions to resolve the discrepancy in response to the discrepancy being present.

Another embodiment of the present disclosure provides a computer program product for processing information discrepancies in databases managed by services over a network. The computer program product comprises a computer-readable storage media, first program code, second program code, third program code, and fourth program code which are stored on the computer-readable storage media. The first program code receives a number of images from a display of first information on a data processing system in communication with a first service. The number of images is generated from a live view on a head-mounted display system operated by a user and received over the network while the live view of the display of the first information on the data processing system is present. The second program code determines whether the first information displayed on the data processing system corresponds to second information managed by a second service using the number of images received over the network from the head-mounted display system. The third program code determines whether a discrepancy is present between the first information and the second information in response to the first information corresponding to the second information. The fourth program code performs a number of actions through displaying augmented reality information on the live view on the head-mounted display system to resolve the discrepancy in response to the discrepancy being present.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that when an application configured to access one database is unable to access another database, creating an interface may be more difficult, costly, and time-consuming than desired. The illustrative embodiments recognize and take into account that using two applications to access two different databases is more difficult and complex than desired. The illustrative embodiments recognize and take into account that migrating or changing a database to use a single application may be infeasible in many cases.

The illustrative embodiments recognize and take into account that, in some cases, an interface, such as middleware, may be available to access databases. The illustrative embodiments recognize and take into account that synchronizing the databases may be more time-consuming than desired depending on the size of the databases.

Thus, the illustrative embodiments provide a method, an apparatus, a system, and a computer program product for synchronizing data and, in particular, for synchronizing data in databases. In one illustrative example, a method is present for synchronizing databases. A computer system detects first information in a live view on a mobile display system while the first information is displayed by a first service on a data processing system. The first information corresponds to second information managed by a second service in communication with the mobile display system. The computer system determines whether a discrepancy is present between the first information displayed on the data processing system and the second information managed by the second service.

The computer system performs a number of actions to resolve the discrepancy in response to the discrepancy being present.

As used herein, "a number of," when used with reference items, means one or more items. For example, "a number of actions" is one or more actions.

Figure 1:
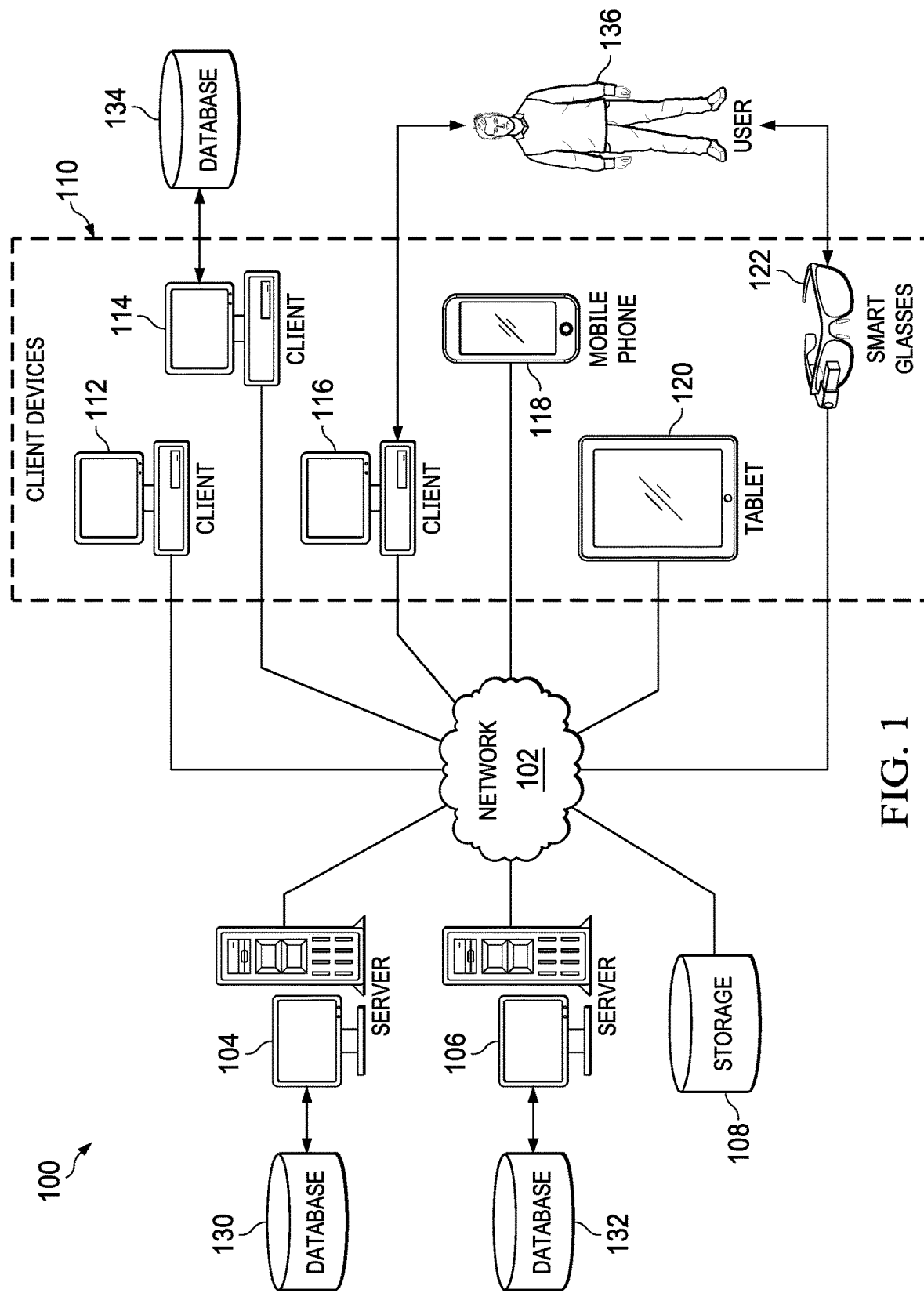
FIG. 1 a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices, such as mobile phone 118, tablet computer 120, and smart glasses 122. In this illustrative example, some or all of client devices 110 may form an Internet of things (IOT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, one or more data processing systems in network data processing system 100 can include databases. For example, server computer 104 includes database 130, server computer 106 includes database 132, and client computer 114 includes database 134.

These databases can be synchronized by user 136 accessing two of these databases. For example, user 136 can access database 130 using client computer 116 and can access database 132 using smart glasses 122. As depicted, the synchronization may be performed for the portions of data in database 130 displayed on client computer 116 by user 136. Synchronization can be performed via smart glasses 122 employing augmented reality processes.

Figure 2:
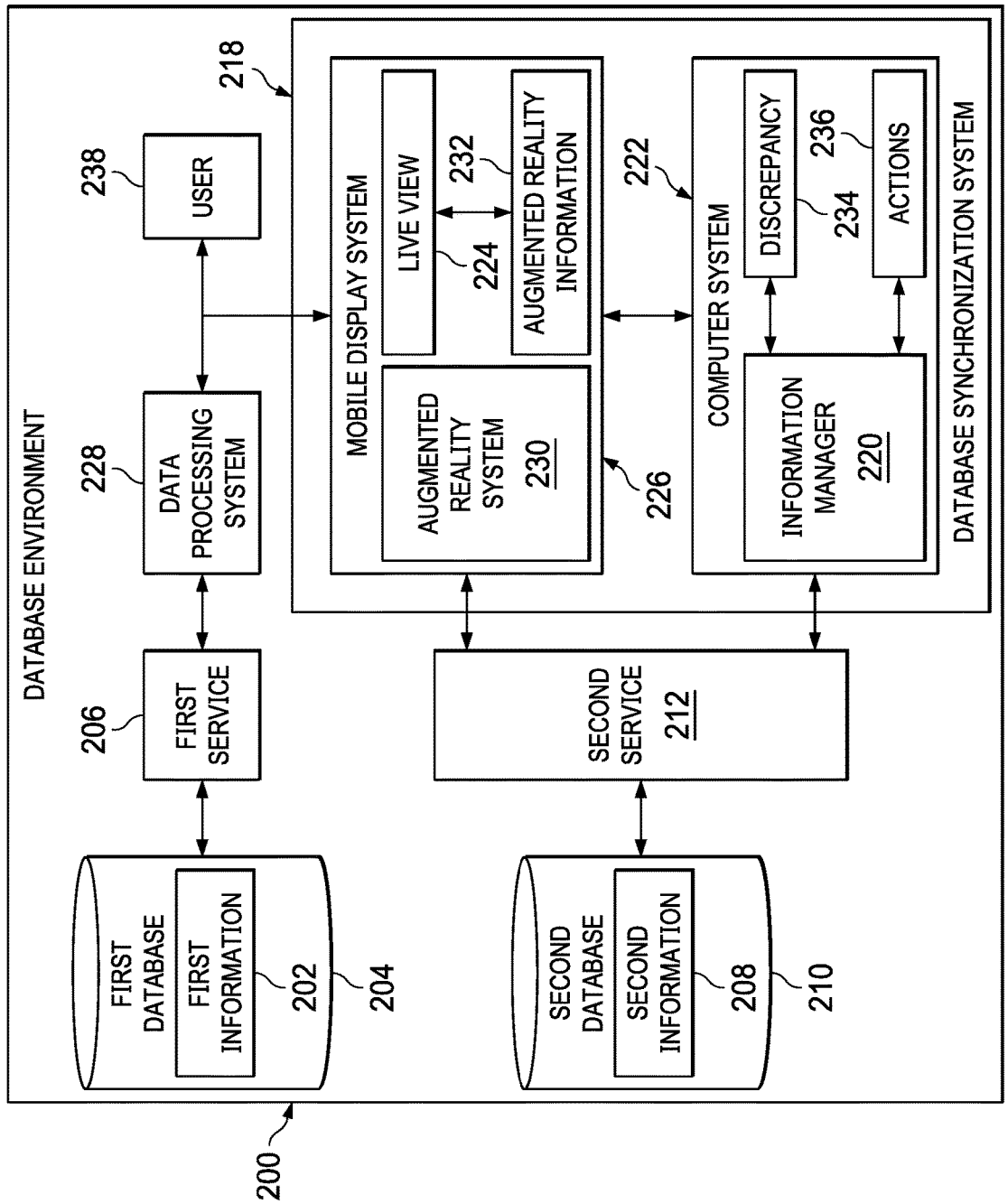
FIG. 2 is a block diagram of a database environment in accordance with an illustrative embodiment.

With reference now to FIG. 2, a block diagram of a database environment is depicted in accordance with an illustrative embodiment. In this illustrative example, database environment 200 includes first information 202 stored in first database 204 in which first information 202 is managed by first service 206. Second information 208 is stored in second database 210 and is managed by second service 212.

First information 202 and second information 208 can be various types of information. For example, first information 202 and second information 208 may be selected from at least one of current tax withholdings for a number of employees, vacation days remaining for the number of employees, personal time off remaining for the number of employees, a social security number, a home address, a salary for the number of employees, or some other type of information.

In this illustrative example, first service 206 and second service 212 are software processes that run on hardware. The hardware may be at least one of a server computer, a workstation, a group of computers, or some other type of hardware. First service 206 and second service 212 may be selected from at least one of a human resources service, a payroll service, a compliance service, a tax compliance service, a benefits service, a retirement planning service, or some other suitable type of service.

As depicted, database synchronization system 218 operates to synchronize first information 202 and second information 208 with each other. The synchronization of first information 202 and second information 208 may be all or part of first information 202 and second information 208. In other words, some or all records or pieces of information in first information 202 and second information 208 can be synchronized.

In this illustrative example, information manager 220 runs on computer system 222 within database synchronization system 218. Computer system 222, in the illustrative example, is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system. In this example, computer system 222 may be a part of network data processing system 100 in FIG. 1. Computer system 222 may include one or more data processing systems or networks within network data processing system 100 in FIG. 1.

As depicted, information manager 220 is in communication with mobile display system 226 and detects first information 202 in live view 224 on mobile display system 226 while first information 202 is displayed by first service 206 on data processing system 228. Mobile display system 226 is configured to operate as augmented reality system 230 in which augmented reality information 232 is displayed as virtual content over live view 224. In this illustrative example, mobile display system 226 may be selected from one of a head-mounted display, a mobile phone, a tablet computer, smart glasses, wearable computer glasses, or other suitable types of mobile display systems.

As depicted, live view 224 may be provided by mobile display system 226 as a video feed on a display or by using transparent, see-through displays or lenses, such that the user is able to see the physical environment through the display. For example, live view 224 can be seen on a display for mobile display system 226 in the form of a head-mounted display or a tablet computer. The virtual content can be superimposed on the display device in this type of mobile display system. In other illustrative examples, live view 224 may be provided indirectly to a display in which other information is displayed to overlap live view 224. Live view 224 can be provided using a camera system that displays images or video on a display device in mobile display system 226.

In another illustrative example, live view 224 may be seen directly by user 238 of mobile display system 226 with augmented reality information 232 being displayed over what the user sees in live view 224. When live view 224 is seen directly by the user, the detection of live view 224 can be performed by using a sensor system, such as a camera system for mobile display system 226.

In this illustrative example, first information 202 corresponds to second information 208 managed by second service 212. In the illustrative example, information manager 220 can access second database 210. This access is depicted as being provided through second service 212. In other illustrative examples, information manager 220 may directly access second database 210. Information manager 220 determines whether discrepancy 234 is present between first information 202 displayed on data processing system 228 and second information 208 managed by second service 212.

In the illustrative examples, first information 202 and second information 208 may be employee information in spreadsheets in first database 204 and second database 210. This employee information may include information used for compliance with at least one of state tax laws, federal tax laws, state regulations, federal regulations, withholdings, or other types of compliance rules or regulations. The rules or regulations may be from a government entity or set by an organization or association. The employee information includes at least one of jurisdictions, tax rates, wage garnishment, wage payments, tax credits, withholdings, or other suitable types of information.

As depicted, information manager 220 performs a number of actions 236 to resolve discrepancy 234 in response to discrepancy 234 being present. The number of actions 236 performed by information manager 220 can take a number of different forms. For example, information manager 220 can display augmented reality information 232 as virtual content over live view 224.

As depicted, user 238 operates data processing system 228 to select first information 202 for display on data processing system 228. User 238 may interact with first information 202. Further, user 238 operates mobile display system 226. When mobile display system 226 takes the form of a head-mounted display, user 238 does not need to actively point or direct mobile display system 226 to the display of data processing system 228. Instead, user 238 viewing or looking at the display of first information 202 automatically provides live view 224 of first information 202 displayed on data processing system 228.

Additionally, with user 238 using first information 202 on data processing system 228, information manager 220 detects first information 202 for synchronization with second information 208 that corresponds to first information 202. In other words, the synchronization is not performed for all of the information in first database 204. Instead, the synchronization is based on information selected for use by user 238 and displayed on data processing system 228. First information 202 may be at least one of information that is currently being used, updated, needed for a payroll process, needed for a withholding process, needed for a compliance process, or some other process.

As a result, synchronizing this type of information can provide for more efficient synchronization between information in first database 204 and second database 210. Further, the synchronizing of information between first database 204 and second database 210 may be performed more efficiently.

For example, less time and fewer resources may be needed because a user, such as user 238, indicates what information is of importance for synchronization between the databases. As a result, other information in the databases can be synchronized at a later time or may not be synchronized until viewed in live view 224 for mobile display system 226 when accessed by user 238 or some other user operating mobile display system 226.

In the illustrative example, information manager 220 may be implemented in software, hardware, firmware, or a combination thereof. When software is used, the operations performed by information manager 220 may be implemented in program code configured to run on hardware, such as a processor unit. When firmware is used, the operations performed by information manager 220 may be implemented in program code and data and stored in persistent memory to run on a processor unit. When hardware is employed, the hardware may include circuits that operate to perform the operations in information manager 220.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, database synchronization system 218 can operate as an augmented reality database synchronization system when information in live view 224 of mobile display system 226 is detected and performs actions 236 that include displaying augmented reality information 232 over live view 224 on mobile display system 226. Actions 236 include, for example, displaying augmented reality information 232 indicating discrepancy 234 is present, prompting for user input, or some other type of action that can be displayed in augmented reality information 232 on mobile display system 226. Other actions in actions 236 may include actions performed to update second information 208 using first information 202.

In this manner, real world actions performed using second information 208 may be performed with increased confidence in the accuracy of second information 208. Further, updates to second information 208 may be performed more quickly in contrast to waiting for a separate process to synchronize information between the databases. In other words, even if middleware or other software is present for synchronizing first database 204 with second database 210, those processes may take more time and introduce more delays in processing information in second database 210 that may be needed more quickly as compared to other information in second database 210 that may be for prior or already performed operations, such as a prior payroll, or stored in second database 210 for archival purposes.

In one illustrative example, one or more technical solutions are present that overcome a technical problem with synchronizing data in databases. As a result, one or more technical solutions may provide a technical effect of enabling reducing resources needed to synchronize data in the databases. For example, one or more technical solutions may result in reducing at least one of time, expense, or effort needed to create a software application that accesses two databases. For example, creating or modifying middleware to access two databases to perform synchronization of data may be avoided. Further, even when software is present to access two databases, the illustrative example provides one or more technical solutions that may result in synchronizing data that is currently being accessed in a database or has been recently accessed in the database.

As a result, the illustrative example provides one or more technical solutions that may include a technical effect of synchronizing data in a database that is considered important or having priority based on the use of the information in the database. Thus, the illustrative example provides one or more technical solutions that may include a technical effect of providing a priority to synchronize data that may be needed more quickly as compared to other data not being accessed in the database. The access, in this illustrative example, is accessing the information that is used to perform operations in an organization.

As a result, computer system 222 operates as a special purpose computer system in which information manager 220 in computer system 222 enables synchronizing of information in databases. For example, information manager 220 enables synchronizing first information 202 in first database 204 with second information 208 in second database 210 in a more efficient manner than with currently used techniques. In particular, information manager 220 transforms computer system 222 into a special purpose computer system as compared to currently available general computer systems that do not have information manager 220.

The illustration of database environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, information manager 220 is shown as being located in computer system 222 and in communication with second service 212. In some illustrative examples, second service 212 may be located within computer system 222. Further, information manager 220 may be a component within second service 212 in computer system 222 in some illustrative examples.

Further, one or more users with one or more mobile display systems can be used in place of or in addition to user 238 and mobile display system 226. The different users can access information in first database 204 that is then related and compared to information in second database 210. In still other illustrative examples, first information 202 can be compared with other information and other databases in addition to second information 208 in second database 210. For example, first information 202 may also be located in other databases that also may need to be compared to determine whether the information is the same or whether discrepancies are present.

Additionally, data processing system 228 is shown as being a separate component outside of database synchronization system 218. In other illustrative examples, data processing system 228 can be considered part of database synchronization system 218 along with mobile display system 226 and information manager 220 in computer system 222.

Figure 3:
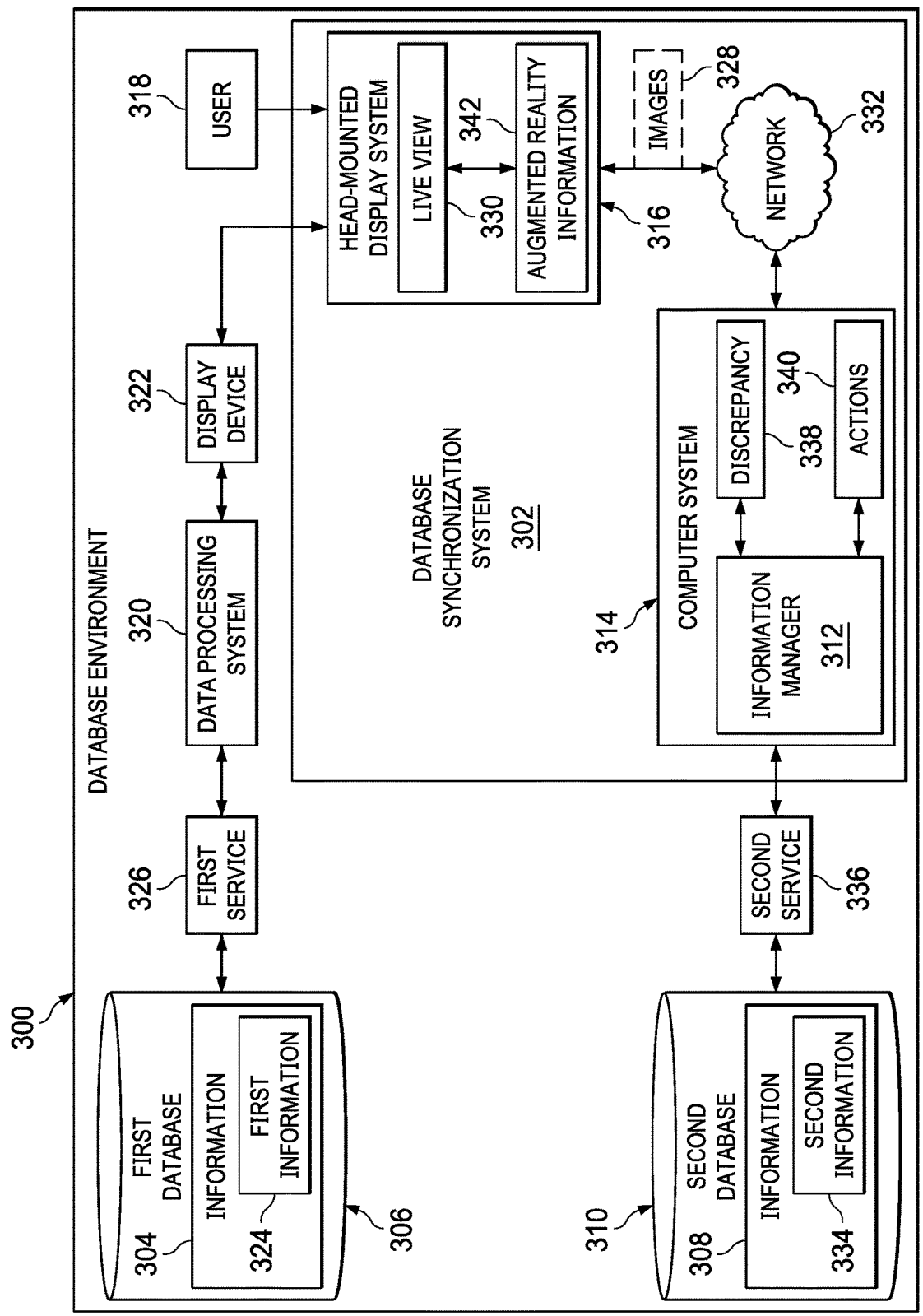
FIG. 3 is a dataflow diagram for synchronizing databases using a head-mounted display system in accordance with an illustrative embodiment.

With reference next to FIG. 3, a dataflow diagram for synchronizing databases using a head-mounted display system is depicted in accordance with an illustrative embodiment. In this example, database environment 300 includes database synchronization system 302, which is configured to synchronize information 304 for first database 306 and information 308 for second database 310.

In this illustrative example, database synchronization system 302 comprises information manager 312 in computer system 314 and head-mounted display system 316. Information manager 312 can be implemented in hardware, software, and a combination thereof in a similar manner to information manager 220 in FIG. 2. Head-mounted display system 316 is a physical device and is an example of an implementation for mobile display system 226 in FIG. 2.

As depicted, user 318 wears head-mounted display system 316 while operating data processing system 320. Data processing system 320 can be a workstation, a desktop computer, a laptop computer, a tablet computer, or some other suitable type of data processing system. In this illustrative example, user 318 looks at display device 322 for data processing system 320 in performing different operations. For example, if user 318 performs payroll operations, user 318 may access information 304 in first database 306 to process a payroll.

In this illustrative example, user 318 accesses first database 306 to display first information 324 on display device 322 of data processing system 320. As depicted, data processing system 320 is in communication with first service 326 which manages information 304 in first database 306. First information 324 is a portion of information 304 stored in first database 306.

Head-mounted display system 316 generates a number of images 328 from the display of first information 324 on data processing system 320. In particular, the number of images 328 are of first information 324 displayed on display device 322 for data processing system 320.

In the illustrative example, head-mounted display system 316 can continuously generate images 328, periodically generate images 328, or generate images 328 when head-mounted display system 316 is directed towards display device 322 in data processing system 320. The number of images 328 is generated from live view 330 on head-mounted display system 316.

As depicted, information manager 312 running on computer system 314 receives the number of images 328 from the display of first information 324 on data processing system 320 in communication with first service 326. In this example, the number of images 328 is generated from live view 330 on head-mounted display system 316 operated by user 318. The number of images 328 is received by information manager 312 over network 332 while live view 330 of the display of first information 324 on display device 322 for data processing system 320 is present.

Information manager 312 determines whether first information 324 displayed on data processing system 320 corresponds to second information 334 managed by second service 336 using the number of images 328 received over network 332 from head-mounted display system 316. Information manager 312 determines whether discrepancy 338 is present between first information 324 and second information 334 in response to first information 324 corresponding to second information 334.

As depicted, information manager 312 may perform a number of actions 340 through displaying augmented reality information 342 on live view 330 on head-mounted display system 316 to resolve discrepancy 338 in response to discrepancy 338 being present between first information 324 and second information 334. The number of actions 340 that displays augmented reality information 342 on live view 330 may take a number of forms.

For example, information manager 312 may display a graphical indicator on live view 330 on head-mounted display system 316 in association with first information 324 displayed on live view 330 of first information 324. The graphical indicator is displayed in association with first information 324 by being displayed in at least one of a location or manner that draws attention of user 318 of head-mounted display system 316 to discrepancy 338. The graphical indicator may be, for example, selected from at least one of text, color, bolding, an icon, animation, flashing text, an image, or some other suitable graphical indicator that can be used to draw the attention of user 318.

In another illustrative example, information manager 312 can display a prompt on live view 330 on head-mounted display system 316 for user input to resolve discrepancy 338. In this manner, the user input may be used to confirm other actions in actions 340 that are reported that may be performed by information manager 312. For example, the user input may be used to confirm whether changes should be made to second information 334. The prompt may indicate what changes are proposed in the user input and may verify whether the changes should be made. In other examples, the prompt may request user input identifying what information from first information 324 should be used to change second information 334.

The illustration of the dataflow diagram synchronizing databases using head-mounted display system 316 that generates images 328 of first information 324 displayed from first database 306 in database synchronization system 302 is provided as one illustrative example of a more detailed implementation for database synchronization system 218 shown generally in FIG. 2. This depicted example is not meant to limit the manner in which other illustrative examples may be implemented in accordance with an illustrative embodiment.

For example, a tablet computer may be used in other illustrative examples in place of head-mounted display system 316. The tablet computer may be held by user 318 or placed in a position by user 318 to provide a live view of first information 324 displayed on display device 322 for data processing system 320. In still other illustrative examples, additional users with additional head-mounted displays or other mobile display systems may be present in database synchronization system 302 that generates images 328 of information 304 in first database 306 accessed by those users on their data processing systems. In still other illustrative examples, users may access information in other databases that may be synchronized with second database 310 or other databases that may be managed through information manager 312 in database synchronization system 302.

Figure 4:
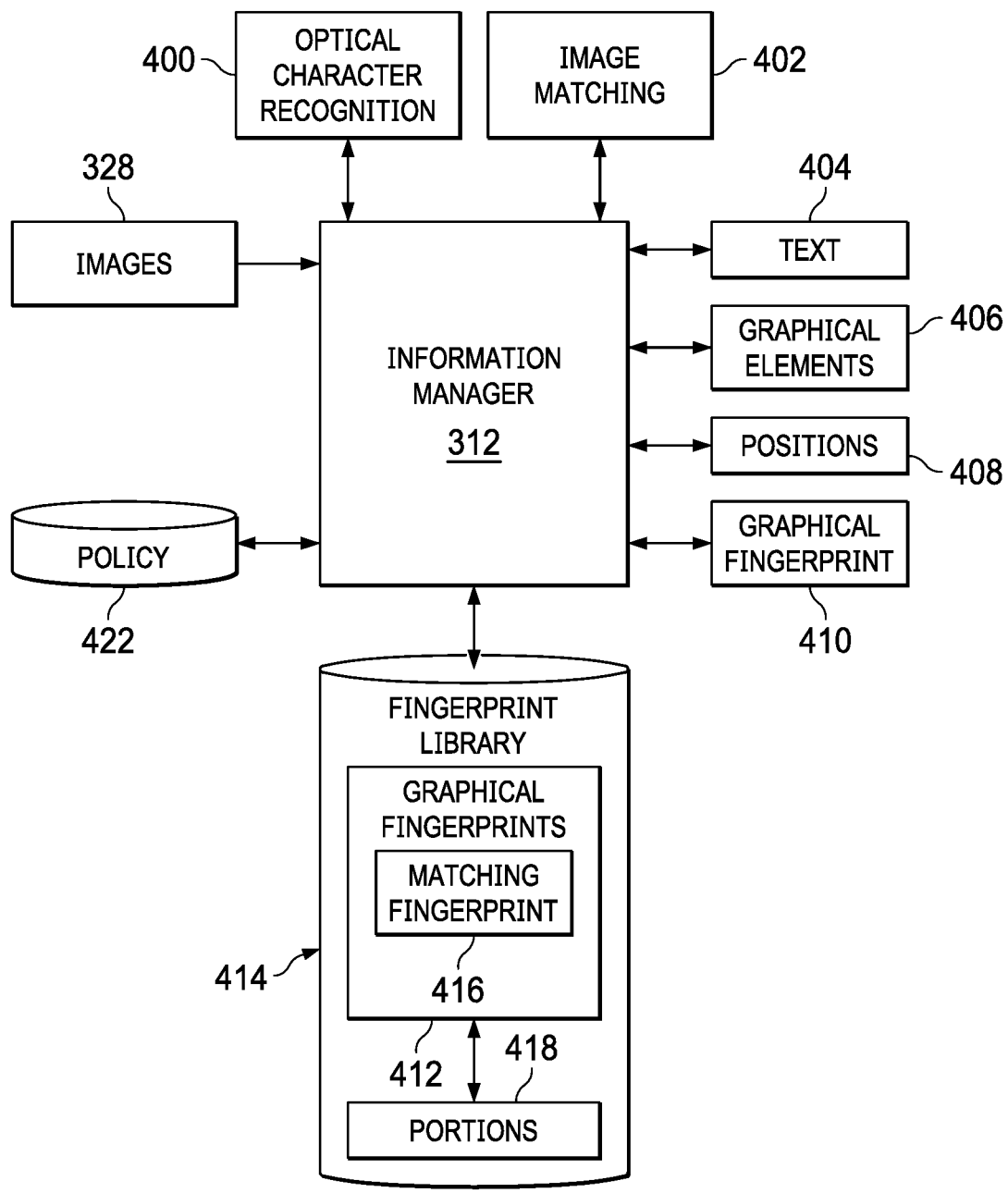
FIG. 4 is a dataflow diagram for comparing information displayed on a data processing system with information stored on a database in accordance with in illustrative embodiment.

Turning next to FIG. 4, a dataflow diagram for comparing information displayed on a data processing system with information stored on a database is depicted in accordance with an illustrative embodiment. In this illustrative example, information manager 312 from FIG. 3 performs at least one of optical character recognition 400 or image matching 402 in a number of images 328 of first information 324 in first database 306 in FIG. 3.

With optical character recognition 400, text 404 for first information 324 in FIG. 3 is generated. Text 404 is used by information manager 312 to search second database 310 for second information 334 that corresponds to first information 324 and first database 306 in FIG. 3.

In this illustrative example, text 404 for first information 324 does not have to be a match to second information 334 to correspond to second information 334. If a match is present, then no action needs to be taken with respect to second information 334. A correspondence between text 404 and second information 334 is considered to be present when text 404 contains information that is the same type as second information 334. For example, text 404 can identify at least one of a category, a record, a use, dates, or other information that indicates that text 404 represents information of the same type as second information 334. Other information in first information 324 in text 404 that can be used to correspond text 404 to second information 334 includes, for example, at least one of a jurisdiction, a business entity identification, a check date, a transmission date, an agency name, an employee name, a tax type, a liability, an identification of an impound, a remittance, a document identification, or other suitable information.

For example, text 404 for first information 324 can be a type of information, such as employee information for a group of employees, in which the employee information includes at least one of a Social Security number, an employee name, a home address, an employee identifier, or other types of information about the group of employees. As used herein, "a group of," when used with reference to items, means one or more items. For example, "a group of employees" is one or more employees.

As depicted, text 404 can be used to search for second information 334, which is employee information for the same group of employees. In some illustrative examples, second information 334 may contain a subset of the group of employees in text 404 and may be considered to correspond to first information 324.

As another example, text 404 for first information 324 may be a type of information, such as payroll information used by a payroll service. The payroll information in text 404 may include at least one of an employee name, an employee identifier, an amount of pay, a payday, a salary, or other payroll information. The identification of first information 324 can be used to identify second information 334 used by a withholding service. For example, second information 334 contains payroll information used by the withholding service to calculate withholdings. In this example, second information 334 includes employee names, employee identifiers, amounts of pay, and paydays for different payroll.

In this illustrative example, second information 334 is determined to correspond to first information 324 because both are a type of information in the form of payroll information. Although first information 324 contains additional information, such as salary, the correspondence is still present. In other words, an exact match of information does not have to be present.

As depicted, this determination can be made using policy 422. Policy 422 comprises a number of rules and also may include data for use when applying the number of rules. The number of rules in policy 422 are used to determine when text 404 in first information 324 corresponds to second information 334. The number of rules may identify what parameters or pieces of information are needed in first information 324 to correspond to second information 334. As an example, the number of rules in policy 422 states that an employee name, an employee identifier, an amount of pay, and a payday is needed for the correspondence. The correspondence can still be present when other information is present in first information 324 in addition to the parameters identified in policy 422.

If the amount of pay for the employee identified for the payday in text 404 is not present in second information 334, second information 334 may be updated to include the current pay for the payday identified text 404. With the current pay from text 404, new withholdings from the payroll information updated in second information 334 can be identified for the employee identified in text 404.

When image matching 402 is used, information manager 312 searches for a group of graphical elements 406 in the group of images 328. The group of graphical elements 406 may include at least one of a graphic, a picture, an icon, and other elements in the group of images 328.

Information manager 312 also identifies a group of positions 408 for the group of graphical elements 406 in the group of images 328. The group of graphical elements 406 and the group of positions 408 in the group of images 328 form graphical fingerprint 410 for the group of images 328.

Information manager 312 compares graphical fingerprint 410 to graphical fingerprints 412 in fingerprint library 414. Graphical fingerprints 412 in fingerprint library 414 are associated with portions 418 of information 308 in second database 310 in FIG. 3.

Each graphical fingerprint in graphical fingerprints 412 in fingerprint library 414 includes an identification of a portion of information 308 in second database 310. In other words, fingerprint library 414 provides an ability to identify second information 334 in information 308 in second database 310 that corresponds to first information 324 in first database 306 from the group of images 328 generated by head-mounted display system 316 in FIG. 3.

For example, a payroll screen containing first information 324 in the group of images 328 may include a logo on the upper left-hand corner, a graphic "Company ABC Payroll" on the top center, or a graphic for an employee identifier column header. These graphical elements may form graphical fingerprint 410 when the group of images 328 is processed by information manager 312. Graphical elements 406 and positions 408 of graphical elements 406 in the group of images 328 are compared with graphical fingerprints 412 in fingerprint library 414.

In this example, matching fingerprint 416 in graphical fingerprints 412 is for second information 334 in FIG. 3. In other words, matching fingerprint 416 has the same graphical elements and positions for those graphical elements as graphical fingerprint 410 generated from the group of images 328 of first information 324.

Thus, knowledge about the manner in which first information 324 is displayed on display device 322 for data processing system 320 can be used to more quickly and efficiently identify second information 334. For example, the prior knowledge can be based on knowing how first service 326 displays first information 324 on display device 322 in data processing system 320.

In this illustrative example, image matching 402 may be used as a first pass to determine whether to perform optical character recognition 400. Text 404 can then be used to determine whether updates are needed to second information 334.

By delaying the use of optical character recognition 400 until second information 334 is identified, increased speed and reduced use of resources occur in correlating first information 324 to second information 334. In other illustrative examples, both optical character recognition 400 and image matching 402 can be used to correspond first information 324 to second information 334.

Figure 5:
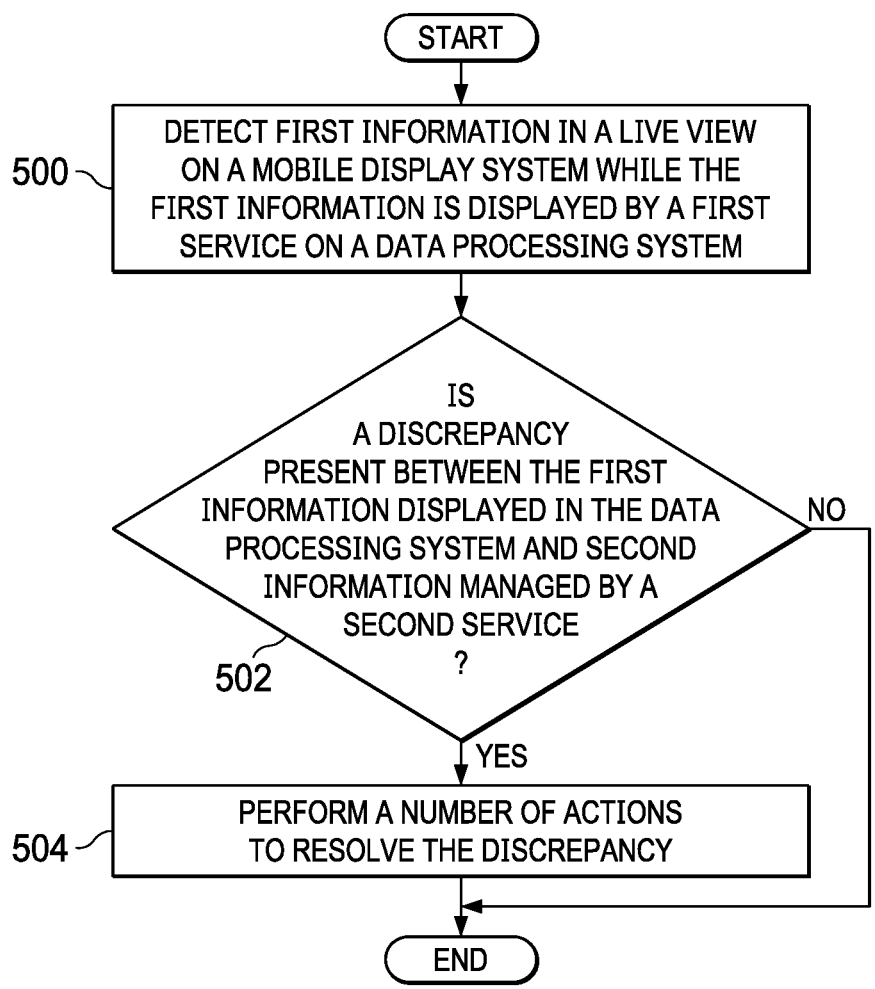
FIG. 5 is a flowchart of a process for synchronizing databases in accordance with an illustrative embodiment.

Turning next to FIG. 5, a flowchart of a process for synchronizing databases is depicted in accordance with an illustrative embodiment. The process illustrated in FIG. 5 can be implemented in at least one of database environment 200 in FIG. 2 or database environment 300 in FIG. 3. The processes in FIG. 5 can be implemented in hardware, software, or both. When implemented in software, the processes can take the form of program code that is run by one or more processor units located in one or more hardware devices. For example, these processes can be implemented in information manager 220 running on computer system 222 in FIG. 2 or information manager 312 running on computer system 314 in FIG. 3.

The process begins by detecting first information in a live view on a mobile display system while the first information is displayed by a first service on a data processing system (step 500). In step 500, the information is displayed on the data processing system using a display device for the data processing system. The first information in step 500 corresponds to second information managed by a second service.

The process determines whether a discrepancy is present between the first information displayed in the data processing system and second information managed by a second service (step 502). Responsive to the discrepancy being present, the process performs a number of actions to resolve the discrepancy (step 504). The process terminates thereafter.

As part of performing the number of actions to resolve the discrepancy in step 504, the process can display augmented reality information on the mobile display system to interact with a user of the mobile display system. For example, the process can display a graphical indicator on a live view on the mobile display system in association with the first information displayed in the live view of the first information on the mobile display system. The graphical indicator draws attention of the user of the mobile display system to the discrepancy. In another example, the process can display a prompt on the live view on the mobile display system for user input to resolve the discrepancy.

With reference again to step 502, if a discrepancy is not present, the process terminates. This process can be used each time information is displayed on the display device for the mobile display system.

Figure 6:
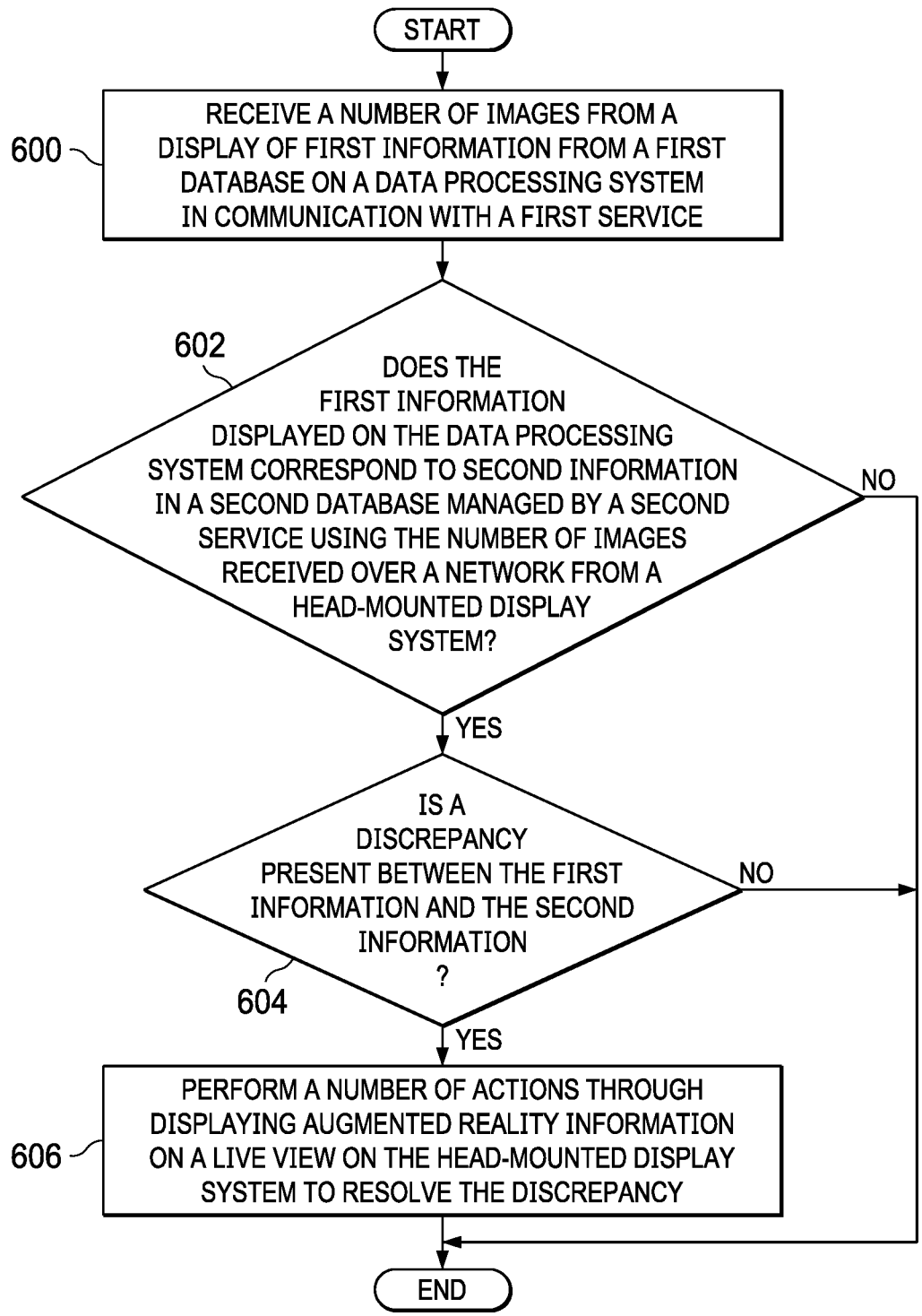
FIG. 6 is a flowchart of a process for synchronizing information in databases managed by services over a network in accordance with an illustrative embodiment.

Turning to FIG. 6, a flowchart of a process for synchronizing information in databases managed by services over a network is depicted in accordance with an illustrative embodiment. The process illustrated in FIG. 6 can be implemented in at least one of database environment 200 in FIG. 2 or database environment 300 in FIG. 3. The processes in FIG. 6 can be implemented in hardware, software, or both. When implemented in software, the processes can take the form of program code that is run by one of more processor units located in one or more hardware devices. For example, these processes can be implemented in information manager 220 running on computer system 222 in FIG. 2 or information manager 312 running on computer system 314 in FIG. 3.

The process begins by receiving a number of images from a display of first information from a first database on a data processing system in communication with a first service (step 600). The number of images is generated from a live view on a head-mounted display system operated by a user. The images are received in step 600 over a network while the live view of the display of the first information from the first database on the data processing system is present.

The process determines whether the first information displayed on the data processing system corresponds to second information in a second database managed by a second service using the number of images received over a network from a head-mounted display system (step 602). Responsive to the first information corresponding to the second information, the process determines whether a discrepancy is present between the first information and the second information (step 604). Responsive to a discrepancy being present, the process performs a number of actions through displaying augmented reality information on a live view on the head-mounted display system to resolve the discrepancy (step 606). The process terminates thereafter.

With reference again to step 602, if the first information does not correspond to the second information, the process terminates. Turning back to step 604, if a discrepancy is not present between the first information and the second information, the process also terminates. This process can be repeated any number of times when processing information from the first database displayed on the data processing system.

Figure 7:
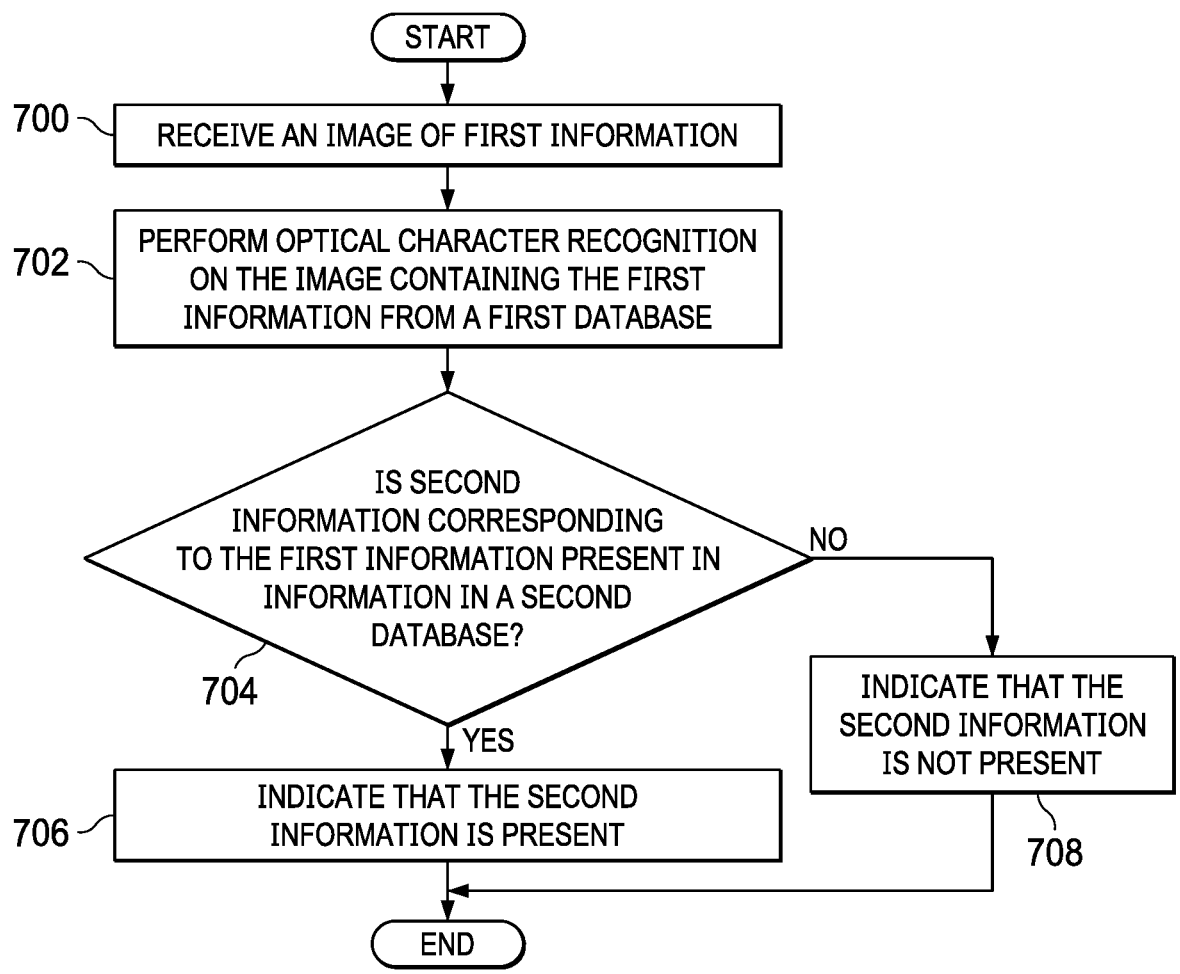
FIG. 7 is a flowchart of a process for finding corresponding information in a database using an optical character recognition process in accordance with an illustrative embodiment.

With reference next to FIG. 7, a flowchart of a process for finding corresponding information in a database using an optical character recognition process is depicted in accordance with an illustrative embodiment. The process in FIG. 7 is an example of an implementation of step 602 in FIG. 6.

The process begins by receiving an image of first information (step 700). The process performs optical character recognition (OCR) on the image containing the first information from a first database (step 702). The process determines whether second information corresponding to the first information is present in information in a second database (step 704). If second information is present in the information in the second database, the process indicates that the second information is present (step 706). The process terminates thereafter. In step 706, the process indicates that the second information present in the second database can be compared to the first information in the image to determine whether a discrepancy is present.

With reference again to step 704, if the second information is not present in the second database, the process indicates that the second information is not present (step 708). The process terminates thereafter. This process can be repeated each time an image of first information is received by information manager 312 in FIG. 3.

Figure 8:
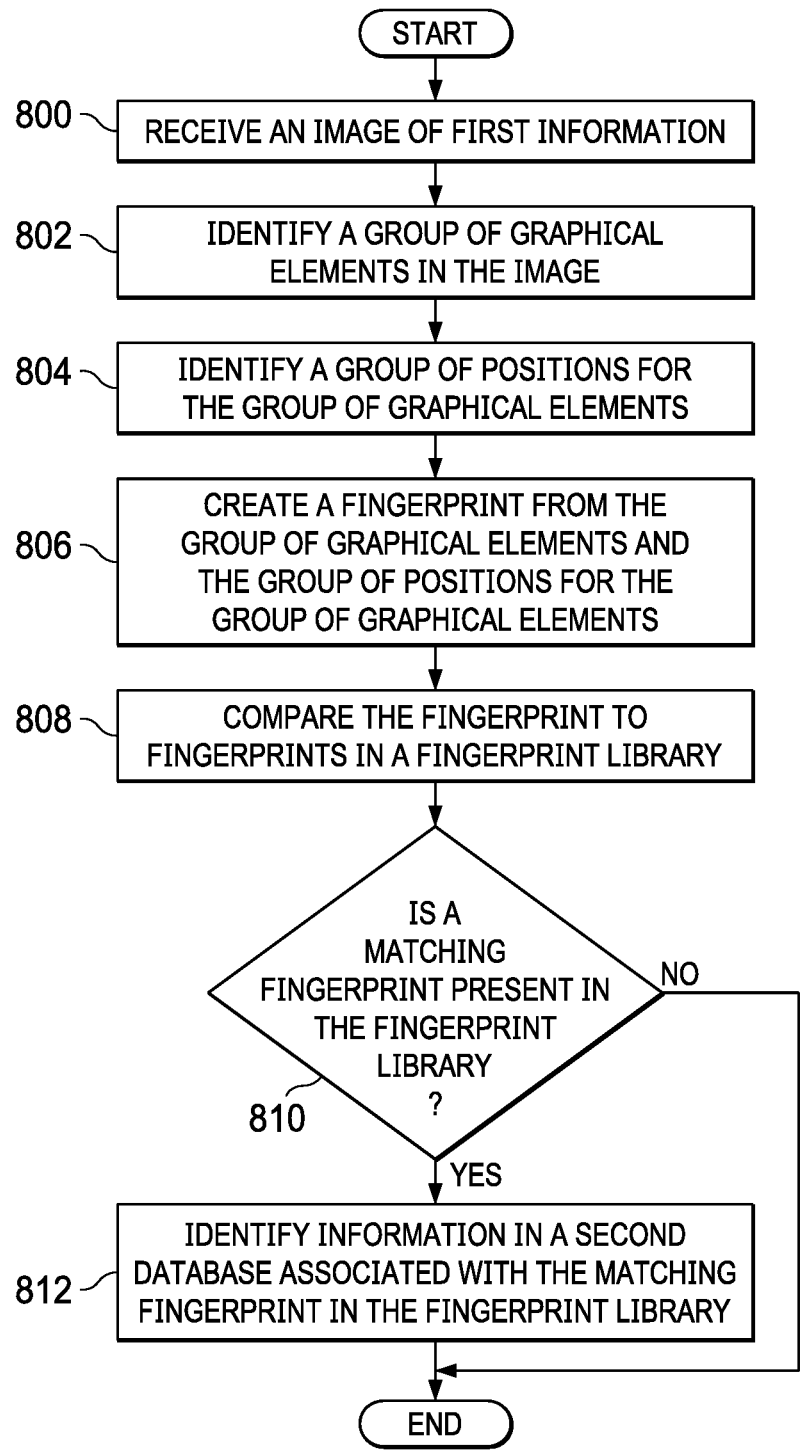
FIG. 8 is a flowchart of a process for finding corresponding information in databases using an image matching process in accordance with an illustrative embodiment.

With reference next to FIG. 8, a flowchart of a process for finding corresponding information in databases using an image matching process is depicted in accordance with an illustrative embodiment. The process in FIG. 8 is an example of an implementation of step 602 in FIG. 6.

The process begins by receiving an image of first information (step 800). The process identifies a group of graphical elements in the image (step 802). The process identifies a group of positions for the group of graphical elements (step 804). The positions can be described in x and y coordinates in step 804.

The process creates a fingerprint from the group of graphical elements and the group of positions for the group of graphical elements (step 806). The fingerprint is a data structure, such as a file, containing the group of graphical elements and their corresponding positions.

The process compares the fingerprint to fingerprints in a fingerprint library (step 808). A determination is made as to whether a matching fingerprint is present in the fingerprint library (step 810). If a matching fingerprint is present, the process identifies information in a second database associated with the matching fingerprint in the fingerprint library (step 812). The process terminates thereafter. Further, if a matching fingerprint is not present in the fingerprint library in step 810, the process also terminates.

This process can be repeated for each image received from a mobile display system. The process in FIG. 8 can be used alone or in combination with the process in FIG. 7 for identifying second information in a second database that corresponds to first information in an image.

Figure 9:
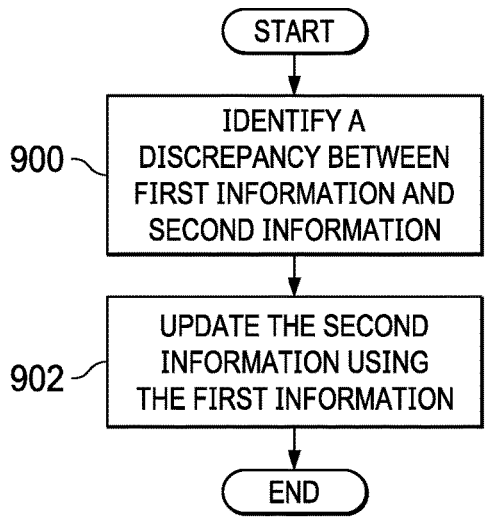
FIG. 9 is a flowchart of a process for performing an action to resolve a discrepancy in accordance with an illustrative embodiment.

Turning to FIG. 9, a flowchart of a process for performing an action to resolve a discrepancy is depicted in accordance with an illustrative embodiment. The process illustrated in FIG. 9 is an example of one implementation for step 504 in FIG. 5.

The process begins by identifying a discrepancy between first information and second information (step 900). The process updates the second information using the first information (step 902). The process terminates thereafter. This process synchronizes the two databases.

Figure 10:
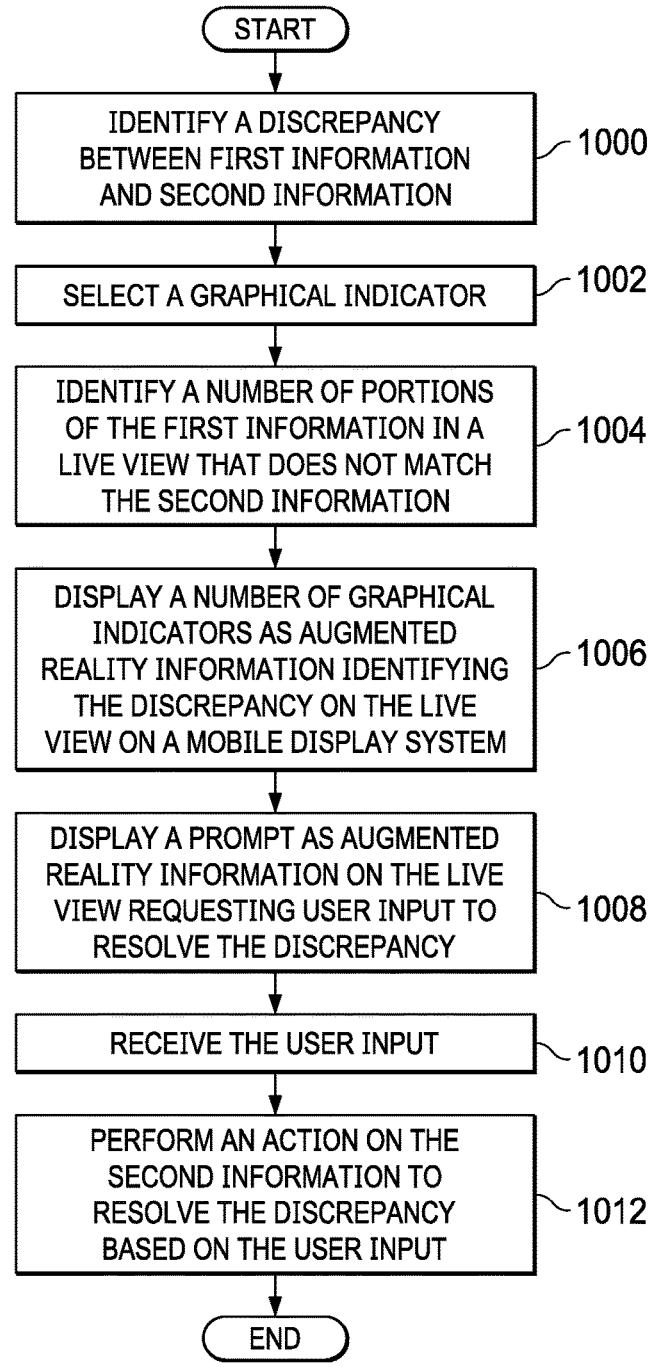
FIG. 10 is a flowchart of a process for performing an action to resolve a discrepancy in accordance with an illustrative embodiment.

With reference next to FIG. 10, a flowchart of a process for performing an action to resolve a discrepancy is depicted in accordance with an illustrative embodiment. The process illustrated in FIG. 10 is an example of one implementation for step 504 in FIG. 5.

The process begins by identifying a discrepancy between first information and second information (step 1000). The process selects a graphical indicator (step 1002). The graphical indicator is selected from at least one of text, color, bolding, an icon, animation, flashing text, an image, or some other suitable graphical indicator that can be used to draw attention of a user.

The process identifies a number of portions of the first information in a live view that does not match the second information (step 1004). The process displays a number of graphical indicators as augmented reality information identifying the discrepancy on the live view on a mobile display system (step 1006). For example, the number of graphical indicators may draw attention to entries or pieces of information in the first information which do not match up with corresponding entries or pieces of information in the second information.

The process displays a prompt as augmented reality information on the live view requesting user input to resolve the discrepancy (step 1008). The process receives the user input (step 1010). For example, the prompt may ask for verification of whether to update particular entries or pieces of information in the second information with the first information. Some examples of user input in step 1010 may include at least one of verifying the identification of an employee, updating a state unemployment insurance rate, confirming an adjustment to a lien according to a court-ordered modification, correcting an amount for a tax liability, identifying subsidiaries for which a tax rate change applies, and other suitable types of user input. The process performs an action on the second information to resolve the discrepancy based on the user input (step 1012). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
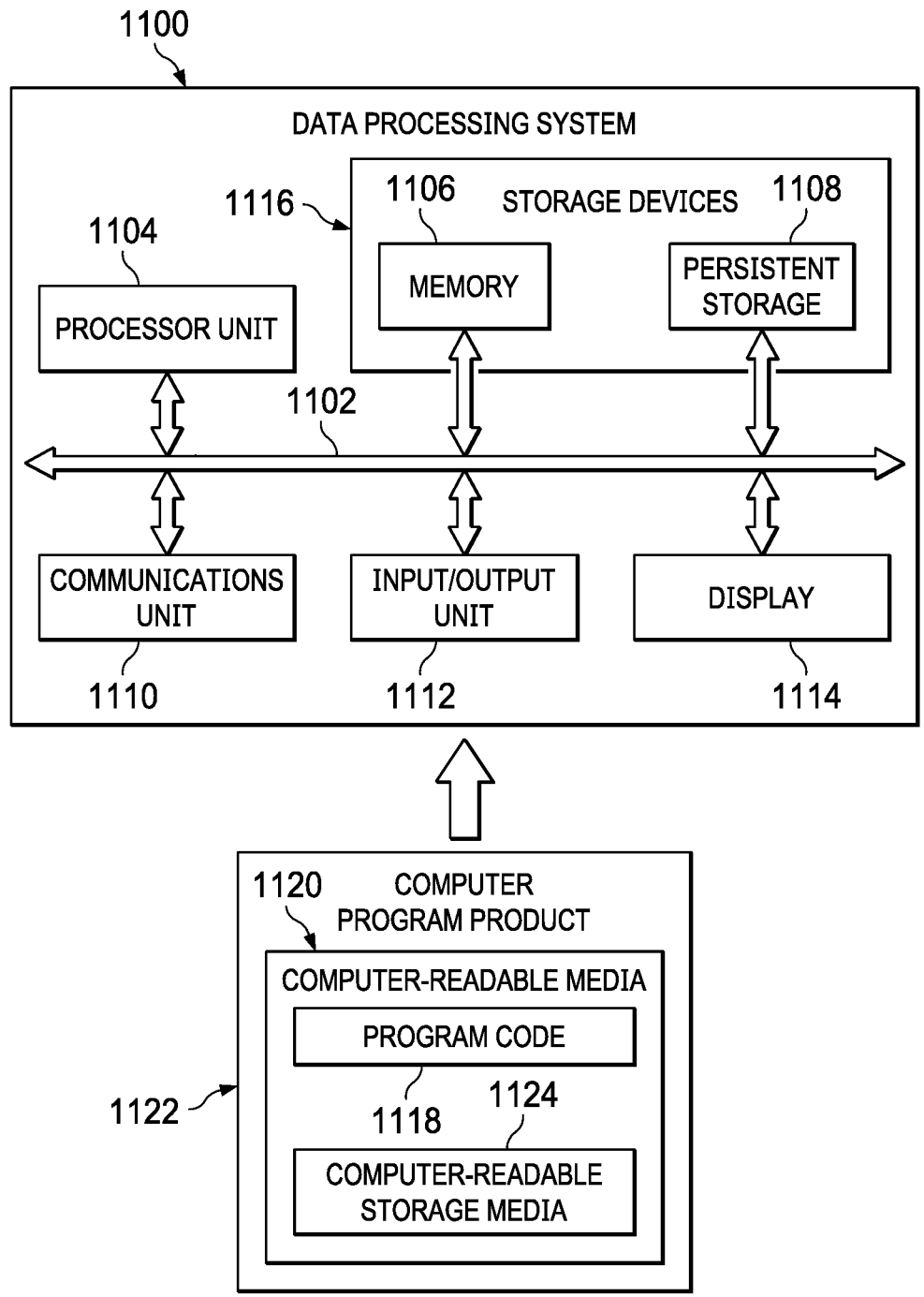
FIG. 11 is a block diagram of a data processing system in accordance with an illustrative embodiment.

Turning now to FIG. 11, a block diagram of a data processing system is depicted in accordance with an illustrative embodiment. Data processing system 1100 may be used to implement server computer 104 in FIG. 1, server computer 106 in FIG. 1, client devices 110 in FIG. 1, computer system 222 in FIG. 2, mobile display system 226 in FIG. 2, data processing system 228 in FIG. 2, computer system 314 in FIG. 3, head-mounted display system 316 in FIG. 3, and data processing system 320 in FIG. 3. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid-state drive (SSD), a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 may be transferred to data processing system 1100 using a computer-readable signal media. The computer-readable signal media may be, for example, a propagated data signal containing program code 1118. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, the illustrative examples provide a method, an apparatus, a system, and a computer program product for synchronizing information in databases. In one illustrative example, a method is present for synchronizing databases. A computer system detects first information in a live view on a mobile display system while the first information is displayed by a first service on a data processing system. The first information corresponds to second information managed by a second service in communication with the mobile display system. The computer system determines whether a discrepancy is present between the first information displayed on the data processing system and the second information managed by the second service. The computer system performs a number of actions to resolve the discrepancy in response to the discrepancy being present.

The illustrative examples provide one or more technical solutions that overcome a technical problem with synchronizing data. As a result, one or more technical solutions may provide a technical effect of enabling reducing resources needed to synchronize information in databases.

For example, one or more technical solutions may result in reducing at least one of time, expense, or effort needed to generate software that communicates with two databases. For example, creating or modifying middleware to access two databases to perform synchronization of data may be avoided. Further, even when software is present to access two databases, the illustrative example provides one or more technical solutions that may result in synchronizing data that is currently being accessed in a database or has been recently accessed in the database.

As a result, the illustrative example provides one or more technical solutions that may include a technical effect of synchronizing data in a database that is considered important based on the use of the information in the database. Thus, the illustrative example provides one or more technical solutions that may include a technical effect of providing a priority to synchronize data that may be needed more quickly as compared to other data not being accessed in the database. The access, in this illustrative example, is to data that is used to perform operations in an organization.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for synchronizing databases, the method comprising:
   detecting, by a computer system, first information in a live view on a mobile display system while the first information is displayed by a first service on a data processing system, wherein the first information corresponds to second information managed by a second service;
   performing a sequence of image matching and optical character recognition on the live view to compare the first information to the second information stored on a database;
   determining, by the computer system, whether a discrepancy is present between the first information displayed on the data processing system and the second information managed by the second service; and
   responsive to the discrepancy being present, performing, by the computer system, a number of actions to resolve the discrepancy, wherein performing, by the computer system, the number of actions to resolve the discrepancy comprises:
      displaying a graphical indicator on the live view on the mobile display system in association with the first information displayed in the live view of the first information on the mobile display system, wherein the graphical indicator draws attention of a user of the mobile display system to the discrepancy; and
      displaying a prompt on the live view on the head-mounted display system for user input to resolve the discrepancy.

2. The method of claim 1, wherein the detecting step comprises:
   receiving a number of images of a display of the first information on the data processing system from the mobile display system; and
   determining whether the first information displayed by the first service corresponds to the second information managed by the second service using the number of images.

3. The method of claim 1, wherein the first information is selected from at least one of current tax withholdings for a number of employees, vacation days remaining for the number of employees, personal time off remaining for the number of employees, a social security number, a home address, or a salary for the number of employees.

4. The method of claim 1, wherein the first service and the second service are selected from at least one of a human resources service, a payroll service, a compliance service, a tax compliance service, a benefits service, or a retirement planning service.

5. The method of claim 1, wherein the mobile display system is selected from one of a head-mounted display, a mobile phone, a tablet computer, smart glasses, and wearable computer glasses.

6. The method of claim 1, wherein the graphical indicator is at least one of: text, color, bolding, icon, animation, flashing text, and image.

7. A method for synchronizing information in databases managed by services over a network, the method comprising:
- receiving, by a computer system, a number of images from a display of first information on a data processing system in communication with a first service, wherein the number of images is generated from a live view on a head-mounted display system operated by a user and received over the network while the live view of the display of the first information on the data processing system is present;
- using image matching of the number of images received over the network from the head-mounted display system to determine, by the computer system, whether the first information displayed on the data processing system corresponds to second information managed by a second service;
- responsive to the first information corresponding to the second information, using optical character recognition of the number of images to determine, by the computer system, whether a discrepancy is present between the first information and the second information; and
- responsive to the discrepancy being present, performing, by the computer system, a number of actions through displaying augmented reality information on the live view on the head-mounted display system to resolve the discrepancy, wherein performing, by the computer system, the number of actions to resolve the discrepancy comprises:
  - displaying a graphical indicator on the live view on the head-mounted display system in association with the first information displayed in the live view of the first information on the head-mounted display system, wherein the graphical indicator draws attention of the user of the head-mounted display system to the discrepancy; and
  - displaying a prompt on the live view on the head-mounted display system for user input to resolve the discrepancy.

8. The method of claim 7, wherein the first information is selected from at least one of current tax withholdings for a number of employees, vacation days remaining for the number of employees, personal time off remaining for the number of employees, a social security number, a home address, or a salary for the number of employees.

9. The method of claim 7, wherein the first service and the second service are selected from at least one of a human resources service, a payroll service, a compliance service, a tax compliance service, a benefits service, or a retirement planning service.

10. The method of claim 7, wherein the graphical indicator is at least one of: text, color, bolding, icon, animation, flashing text, and image.

11. A database synchronization system comprising:
- a computer system comprising a physical hardware system including one or more data processing systems; and
- an information manager running on the computer system, wherein the information manager is in communication with a mobile display system; detects first information in a live view on the mobile display system while the first information is displayed by a first service on a data processing system, wherein the first information corresponds to second information managed by a second service; compares the first information to the second information stored on a database by performing a sequence of image matching and optical character recognition on the live view; determines whether a discrepancy is present between the first information displayed on the data processing system and the second information managed by the second service; and performs a number of actions to resolve the discrepancy in response to the discrepancy being present, wherein in performing the number of actions to resolve the discrepancy, the information manager displays a graphical indicator on the live view on the mobile display system in association with the first information displayed in the live view of the first information on the mobile display system, wherein the graphical indicator draws attention of a user of the mobile display system to the discrepancy, and wherein in performing the number of actions to resolve the discrepancy, the information manager displays a prompt on the live view on the mobile display system for user input to resolve the discrepancy.

12. The database synchronization system of claim 11, wherein in detecting the first information in the live view, the information manager receives a number of images of a display of the first information on the data processing system from the mobile display system; and determines whether the first information displayed by the first service corresponds to the second information managed by the second service using the number of images.

13. The database synchronization system of claim 11, wherein the first information is selected from at least one of current tax withholdings for a number of employees, vacation days remaining for the number of employees, personal time off remaining for the number of employees, a social security number, a home address, or a salary for the number of employees.

14. The database synchronization system of claim 11, wherein the first service and the second service are selected from at least one of a human resources service, a payroll service, a compliance service, a tax compliance service, a benefits service, or a retirement planning service.

15. The database synchronization system of claim 11, wherein the mobile display system is selected from one of a head-mounted display, a mobile phone, a tablet computer, smart glasses, and wearable computer glasses.

16. The database synchronization system of claim 11, wherein the graphical indicator is at least one of: text, color, bolding, icon, animation, flashing text, and image.

17. A database synchronization system comprising:
- a computer system comprising physical a hardware system including one or more data processing systems; and
- an information manager running on the computer system, wherein the information manager receives a number of images from a display of first information on a data processing system in communication with a first service, and wherein the number of images is generated from a live view on a head-mounted display system operated by a user and received over a network while the live view of the display of the first information on the data processing system is present; using image matching of the number of images received over the network from the head-mounted display system to determine whether the first information displayed on the data processing system corresponds to second information managed by a second service; in response to the first information corresponding to the second information, using optical character recognition of the number of images to determine whether a discrepancy is present between the first information and the second information; and performs a number of actions through displaying augmented reality information on the live view on the head-mounted display system to resolve the discrepancy in response to the discrepancy being present, wherein in performing the number of actions to resolve the discrepancy, the information manager displays a graphical indicator on the live view on the head-mounted display system in association with the first information displayed in the live view of the first information on the head-mounted display system, wherein the graphical indicator draws attention of the user of the head-mounted display system to the discrepancy, and wherein in performing the number of actions to resolve the discrepancy, the information manager displays a prompt on the live view on a mobile display system for user input to resolve the discrepancy.

18. The database synchronization system of claim 17, wherein the first information is selected from at least one of current tax withholdings for a number of employees, vacation days remaining for the number of employees, personal time off remaining for the number of employees, a social security number, a home address, or a salary for the number of employees.

19. The database synchronization system of claim 17, wherein the first service and the second service are selected from at least one of a human resources service, a payroll service, a compliance service, a tax compliance service, a benefits service, or a retirement planning service.

20. The database synchronization system of claim 17, wherein the graphical indicator is at least one of: text, color, bolding, icon, animation, flashing text, and image.

21. A computer program product for synchronizing databases, the computer program product comprising:
  a computer-readable storage media;
  program code, stored on the computer-readable storage media, for detecting first information in a live view on a mobile display system while the first information is displayed by a first service on a data processing system, wherein the first information corresponds to second information managed by a second service;
  program code, stored on the computer-readable storage media, for comparing the first information to the second information stored on a database by performing a sequence of image matching and optical character recognition on the live view;
  program code, stored on the computer-readable storage media, for determining whether a discrepancy is present between the first information displayed on the data processing system and the second information managed by the second service; and
  program code, stored on the computer-readable storage media, responsive to the discrepancy being present, for performing a number of actions to resolve the discrepancy, wherein in performing the number of actions to resolve the discrepancy, the program code displays a graphical indicator on the live view on the mobile display system in association with the first information displayed in the live view of the first information on the mobile display system, wherein the graphical indicator draws attention of a user of the mobile display system to the discrepancy.

22. A computer program product for processing information discrepancies in databases managed by services over a network, the computer program product comprising:
  a computer-readable storage media;
  program code, stored on the computer-readable storage media, for receiving a number of images from a display of first information on a data processing system in communication with a first service, wherein the number of images is generated from a live view on a head-mounted display system operated by a user and received over the network while the live view of the display of the first information on the data processing system is present;
  program code, stored on the computer-readable storage media, for using image matching of the number of images received over the network from the head-mounted display system to determine whether the first information displayed on the data processing system corresponds to second information managed by a second service;
  program code, stored on the computer-readable storage media, responsive to the first information corresponding to the second information, for using optical character recognition of the number of images to determine whether a discrepancy is present between the first information and the second information; and
  program code, stored on the computer-readable storage media, responsive to the discrepancy being present, for performing a number of actions through displaying augmented reality information on the live view on the head-mounted display system to resolve the discrepancy, wherein in performing the number of actions to resolve the discrepancy, the program code displays a graphical indicator on the live view on the head-mounted display system in association with the first information displayed in the live view of the first information on the head-mounted display system, wherein the graphical indicator draws attention of a user of the head-mounted display system to the discrepancy, and wherein in performing the number of actions to resolve the discrepancy, an information manager displays a prompt on the live view on the mobile display system for user input to resolve the discrepancy.

* * * * *